United States Patent
Hong

(10) Patent No.: US 11,991,691 B2
(45) Date of Patent: May 21, 2024

(54) METHOD AND APPARATUS FOR SENDING SCHEDULING REQUEST

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 483 days.

(21) Appl. No.: 17/293,516

(22) PCT Filed: Nov. 14, 2018

(86) PCT No.: PCT/CN2018/115343
§ 371 (c)(1),
(2) Date: May 13, 2021

(87) PCT Pub. No.: WO2020/097810
PCT Pub. Date: May 22, 2020

(65) Prior Publication Data
US 2022/0007394 A1 Jan. 6, 2022

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0053* (2013.01); *H04L 5/0082* (2013.01);
(Continued)

(58) Field of Classification Search
CPC . H04W 72/1268; H04W 72/21; H04W 72/20; H04W 16/14; H04W 74/0808;
(Continued)

(56) References Cited

U.S. PATENT DOCUMENTS

| 2012/0100864 A1 | 4/2012 | Susitaival |
| 2012/0122465 A1 | 5/2012 | Landstroem |

(Continued)

FOREIGN PATENT DOCUMENTS

| CN | 101795497 A | 8/2010 |
| CN | 105681003 A | 6/2016 |

(Continued)

OTHER PUBLICATIONS

International Search Report in the international application No. PCT/CN2018/115343, mailed on May 29, 2019.
(Continued)

*Primary Examiner* — Habte Mered
(74) *Attorney, Agent, or Firm* — Syncoda LLC; Feng Ma

(57) ABSTRACT

A method for sending a scheduling request, includes: after triggering a scheduling request, performing listen before talk (LBT) on an unlicensed frequency band; if determined that the unlicensed frequency band is not idle, preparing to perform LBT on the unlicensed frequency band again; if determined that the unlicensed frequency band is idle, sending the scheduling request on the unlicensed frequency band, and starting up a timer, a terminal not sending the scheduling request again before the timer times out, wherein the timer times out when timing reaches a preset time length.

17 Claims, 6 Drawing Sheets

---

LBT is performed on the unlicensed spectrum at least once, and the scheduling request is sent on the unlicensed spectrum each time when it is determined that the unlicensed spectrum is idle, herein a next LBT is performed on the unlicensed spectrum when resource configuration information sent by a base station is not received each time after the scheduling request is sent — S31

A count value of a first counter is incremented by one each time the scheduling request is sent, until the count value of the first counter reaches a first preset value — S32

The timer is started — S33

(51) Int. Cl.
*H04W 16/14* (2009.01)
*H04W 72/21* (2023.01)
*H04W 74/0808* (2024.01)

(52) U.S. Cl.
CPC .......... *H04W 16/14* (2013.01); *H04W 72/21* (2023.01); *H04W 74/0808* (2013.01)

(58) Field of Classification Search
CPC ............ H04W 74/0833; H04L 5/0053; H04L 5/0082; H04L 5/001; H04L 27/0006
See application file for complete search history.

(56) References Cited

U.S. PATENT DOCUMENTS

| | | |
|---|---|---|
| 2014/0016610 A1 | 1/2014 | Susitaival et al. |
| 2014/0016611 A1 | 1/2014 | Susitaival et al. |
| 2015/0327268 A1 | 11/2015 | Susitaival et al. |
| 2018/0124831 A1* | 5/2018 | Dinan ................. H04L 41/0654 |
| 2018/0242357 A1 | 8/2018 | Khirallah et al. |
| 2018/0324635 A1* | 11/2018 | Babaei ................. H04W 72/23 |
| 2021/0100010 A1* | 4/2021 | Yoon ..................... H04W 72/21 |
| 2021/0100018 A1* | 4/2021 | Wu ....................... H04W 72/21 |
| 2021/0274555 A1* | 9/2021 | Alfarhan ........... H04W 74/0808 |
| 2021/0352717 A1* | 11/2021 | Lee ....................... H04W 76/19 |
| 2021/0400736 A1* | 12/2021 | Wang ................. H04W 74/0833 |
| 2022/0039016 A1* | 2/2022 | Terry ................. H04W 52/0235 |

FOREIGN PATENT DOCUMENTS

| | | |
|---|---|---|
| CN | 106714309 A | 5/2017 |
| CN | 107787013 A | 3/2018 |
| CN | 108029141 A | 5/2018 |
| WO | 2011025426 A1 | 3/2011 |

OTHER PUBLICATIONS

Written Opinion of the International Search Authority in the international application No. PCT/CN2018/115343, mailed on May 29, 2019.

3GPP TSG-RAN WG2 Meeting #104 R2-1816260, OPPO, "SR transmission and procedure for NR-U and the corresponding TP", Spokane, USA, Nov. 12-16, 2018.

3GPP TSG-RAN WG2 Meeting #AH-1807 R2-1812328, Nokia, Nokia Shanghai Bell, "Impacts to Scheduling Request procedure due to LBT", Montreal, Canada, Jul. 2-6, 2018.

3GPP TSG-RAN WG2 Meeting #AH-1807 R2-1810212, Nokia, Nokia Shanghai Bell, "MAC impacts due to NR-based access to unlicensed spectrum", Montreal, Canada, Jul. 2-6, 2018.

3GPP TSG-RAN WG2 Meeting #104 R2-1816775, InterDigital, Qualcomm, Panasonic, ZTE, Charter Communications Inc. "Text Proposal for Scheduling Request in NR-U", Spokane, U.S.A, Nov. 12-16, 2018.

First Office Action of the Chinese application No. 201880002525.5, issued on Aug. 31, 2021.

* cited by examiner

METHOD AND APPARATUS FOR SENDING SCHEDULING REQUEST

CROSS-REFERENCE TO RELATED APPLICATION

This application is a U.S. national stage of International Application No. PCT/CN2018/115343 filed on Nov. 14, 2018, the disclosure of which is hereby incorporated by reference in its entirety.

TECHNICAL FIELD

The disclosure relates to the technical field of communications, and in particular, to a method for sending a scheduling request, an apparatus for sending a scheduling request, an electronic device, and a computer-readable storage medium.

BACKGROUND

In 5G New Radio (NR) technology, when user equipment (UE) triggers a scheduling request, a timer is started and the scheduling request is sent, and the UE does not send the scheduling request again before the timer times out.

In the related art, when UE needs to use an unlicensed spectrum, the UE needs to perform Listen Before Talk (LBT) on the unlicensed spectrum to determine whether the unlicensed spectrum is idle, and to use the unlicensed spectrum when the unlicensed spectrum is idle.

Thus, in some scenarios, when the UE needs to send the scheduling request by using the unlicensed spectrum after triggering the scheduling request, if the unlicensed spectrum is determined not to be idle by performing LBT on the unlicensed spectrum, the scheduling request cannot be sent by using the unlicensed spectrum. However, because the scheduling request has been triggered and the timer has been started, there is a case that before the timer times out, even if the unlicensed spectrum is determined to be idle by performing LBT on the unlicensed spectrum again, the scheduling request cannot be sent, thus the opportunity for sending the scheduling request by the UE is delayed to some extent.

SUMMARY

In view of this, embodiments of the disclosure provide a method for sending a scheduling request, an apparatus for sending a scheduling request, an electronic device, and a computer-readable storage medium.

According to a first aspect of the embodiments of the disclosure, there is provided a method for sending a scheduling request, applied to a terminal, herein the method includes the following operations when the terminal needs to send the scheduling request through an unlicensed spectrum.

LBT is performed on the unlicensed spectrum after the scheduling request is triggered.

LBT is prepared to be performed on the unlicensed spectrum again in response to a determination that the unlicensed spectrum is not idle.

The scheduling request is sent on the unlicensed spectrum and a timer is started in response to a determination that the unlicensed spectrum is idle, and the scheduling request is not sent by the terminal again before the timer times out, herein the timer times out when a preset length of time elapses.

In an embodiment, the sending the scheduling request on the unlicensed spectrum and starting the timer includes the following operations.

LBT is performed on the unlicensed spectrum at least once, and the scheduling request is sent on the unlicensed spectrum each time when it is determined that the unlicensed spectrum is idle, herein a next LBT is performed on the unlicensed spectrum when resource configuration information sent by a base station is not received each time after the scheduling request is sent.

A count value of a first counter is incremented by one each time the scheduling request is sent, until the count value of the first counter reaches a first preset value.

The timer is started.

In an embodiment, the first preset value is pre-stored by the terminal or determined according to signaling sent by the base station.

In an embodiment, the sending the scheduling request on the unlicensed spectrum and starting the timer further includes the following operations.

The first counter is reset in response to the determination that the unlicensed spectrum is not idle, after any one LBT is performed on the unlicensed spectrum.

In an embodiment, the method further includes the following operations.

A count value of a second counter is incremented by one when resource configuration information sent by a base station is not received after the timer times out.

Below procedures are re-initiated at least once:
performing LBT on the unlicensed spectrum after the scheduling request is triggered;
preparing to perform LBT on the unlicensed spectrum again in response to a determination that the unlicensed spectrum is not idle;
sending the scheduling request on the unlicensed spectrum and starting a timer in response to the determination that the unlicensed spectrum is idle, herein the timer times out when a preset length of time elapses, the scheduling request is not sent by the terminal again before the timer times out;
herein the count value of the second counter is incremented by one when resource configuration information sent by the base station is not received each time after the timer times out, and the procedures are re-initiated:
performing LBT on the unlicensed spectrum after the scheduling request is triggered;
preparing to perform LBT on the unlicensed spectrum again in response to the determination that the unlicensed spectrum is not idle;
sending the scheduling request on the unlicensed spectrum and starting a timer in response to a determination that the unlicensed spectrum is idle, herein the timer times out when a preset length of time elapses, the scheduling request is not sent by the terminal again before the timer times out;
until the count value of the second counter reaches a second preset value.

Configuration information for a physical uplink control channel (PUCCH) is cleared and random access to the base station is initiated.

In an embodiment, the second preset value is pre-stored by the terminal or determined according to signaling sent by the base station.

In an embodiment, the preset length of time is pre-stored by the terminal or determined according to signaling sent by a base station.

According to a second aspect of the embodiments of the disclosure, there is provided an apparatus for sending a scheduling request, applied to a terminal, herein the apparatus includes an LBT module, a sending module and a timing module, when the terminal needs to send the scheduling request through an unlicensed spectrum.

The LBT module is configured to perform LBT on the unlicensed spectrum after the scheduling request is triggered, herein LBT is prepared to be performed on the unlicensed spectrum again in response to a determination that the unlicensed spectrum is not idle.

The sending module is configured to send the scheduling request on the unlicensed spectrum in response to a determination that the unlicensed spectrum is idle.

The timing module is configured to start a timer, and make the scheduling request not sent by the terminal again before the timer times out, herein the timer times out when a preset length of time elapses.

In an embodiment, the LBT module is configured to perform LBT on the unlicensed spectrum at least once.

The sending module is configured to send the scheduling request on the unlicensed spectrum each time when it is determined that the unlicensed spectrum is idle, herein the LBT module is configured to perform a next LBT on the unlicensed spectrum when resource configuration information sent by a base station is not received each time after the scheduling request is sent.

The apparatus further includes a first counting module.

The first counting module is configured to increment a count value of a first counter by one each time the scheduling request is sent by the sending module, until the count value of the first counter reaches a first preset value.

Herein the timing module is configured to start the timer responsive to the count value of the first counter reaching the first preset value.

In an embodiment, the first preset value is pre-stored by the terminal or determined according to signaling sent by a base station.

In an embodiment, the apparatus further includes a reset module.

The reset module is configured to reset the first counter in response to the determination that the unlicensed spectrum is not idle, after any one LBT is performed by the LBT module on the unlicensed spectrum.

In an embodiment, the apparatus further includes a second counting module.

The second counting module is configured to increment a count value of a second counter by one when resource configuration information sent by a base station is not received after the timer times out.

Herein the LBT module is configured to perform LBT on the unlicensed spectrum at least once after the scheduling request is triggered; herein LBT is prepared to be performed on the unlicensed spectrum again in response to the determination that the unlicensed spectrum is not idle.

The sending module is configured to send the scheduling request on the unlicensed spectrum at least once in response to the determination that the unlicensed spectrum is idle.

The timing module is configured to start the timer at least once, herein the timer times out when a preset length of time elapses, and the scheduling request is not sent by the terminal again before the timer times out.

Herein the count value of the second counter is incremented by one when resource configuration information sent by the base station is not received each time after the timer times out, until the count value of the second counter reaches a second preset value.

A random-access module is configured to clear configuration information for a PUCCH and initiate random access to the base station.

In an embodiment, the second preset value is pre-stored by the terminal or determined according to signaling sent by the base station.

In an embodiment, the preset length of time is pre-stored by the terminal or determined according to signaling sent by a base station.

According to a third aspect of the embodiments of the disclosure, there is provided an electronic device including:
  a processor; and
  a memory configured to store instructions executable by the processor.

Herein the processor is configured to implement steps in the method of any one of the above embodiments.

According to a fourth aspect of the embodiments of the disclosure, there is provided a computer-readable storage medium having stored thereon a computer program that, when executed by a processor, implements steps in the method of any one of the above embodiments.

According to the embodiments of the disclosure, when the terminal needs to send the scheduling request through the unlicensed spectrum, unlike the related art where a timer is started after a scheduling request is triggered, the embodiments further determine whether the unlicensed spectrum is idle after the scheduling request is triggered, and the timer is started when the unlicensed spectrum is idle and the scheduling request is sent on the unlicensed spectrum. Accordingly, it may be ensured that the terminal starts up the timer only after sending the scheduling request, thereby preventing the timer from being started when the terminal triggers a scheduling request but has not sent the scheduling request, which is caused by the unlicensed spectrum not being idle, such that the terminal cannot send the scheduling request before the timer times out, thereby ensuring that the terminal may promptly send the scheduling request.

BRIEF DESCRIPTION OF THE DRAWINGS

In order that the technical solutions in the embodiments of the disclosure may be explained more clearly, reference will made briefly below to the drawings required for the description of the embodiments. It will be apparent that the drawings in the following descriptions are merely some of the embodiments of the disclosure, and other drawings may also be obtained by those of ordinary skill in the art according to the drawings without paying any creative work.

DETAILED DESCRIPTION

The technical solutions in the embodiments of the disclosure will be clearly and completely described below in connection with the drawings in the embodiments of the disclosure. It will be apparent that the described embodiments are merely part of the embodiments of the disclosure, rather than all the embodiments. Based on the embodiments in the disclosure, all other embodiments obtain by those of ordinary skill in the art without paying any creative work fall within the scope of protection of the disclosure.

Figure 1:
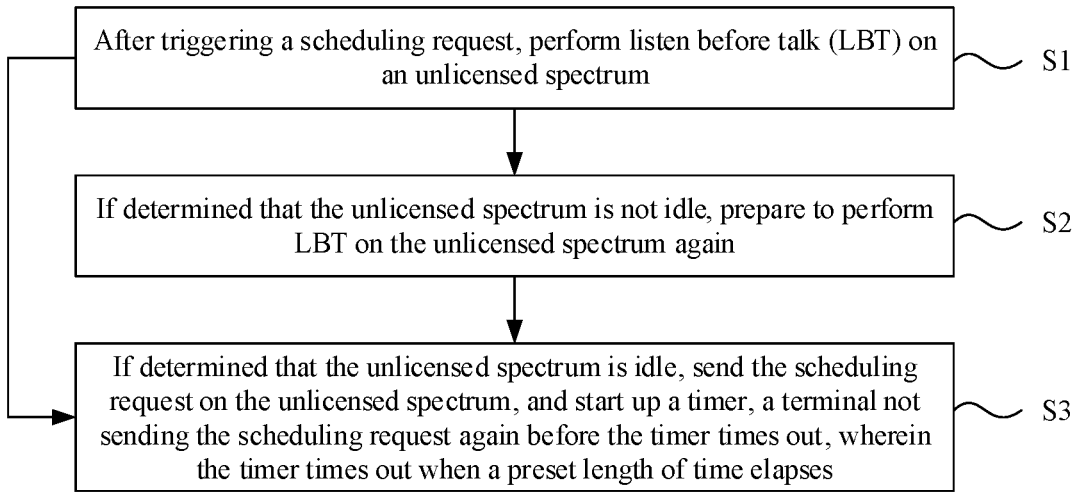
FIG. 1 is a schematic flowchart showing a method for sending a scheduling request according to an embodiment of the disclosure.

FIG. 1 is a schematic flowchart showing a method for sending a scheduling request according to an embodiment of the disclosure. The method shown in the embodiment may be applied to a terminal, herein the terminal may be an electronic device such as a mobile phone, a tablet computer, a wearable device etc., and the terminal may be used as a UE to communicate with a base station, for example, may communicate with the base station based on the 5G NR technology.

As shown in FIG. 1, the method includes the following operations when the terminal needs to send the scheduling request through an unlicensed spectrum.

In operation S1, LBT is performed on the unlicensed spectrum after the scheduling request (abbreviated as SR) is triggered.

In operation S2, LBT is prepared to be performed on the unlicensed spectrum again in response to a determination that the unlicensed spectrum is not idle.

In operation S3, the scheduling request is sent on the unlicensed spectrum and a timer is started in response to a determination that the unlicensed spectrum is idle, and the scheduling request is not sent by the terminal again before the timer times out, herein the timer times out when a preset length of time elapses.

In an embodiment, it may be determined whether the unlicensed spectrum is idle or not idle by performing LBT on the unlicensed spectrum, herein the unlicensed spectrum being idle means that other devices do not occupy the unlicensed spectrum for communication, and the unlicensed spectrum not being idle means that other devices occupy the unlicensed spectrum for communication.

When it is determined that the unlicensed spectrum is idle, the scheduling request may be sent on the unlicensed spectrum and the timer is started. In response to the determination that the unlicensed spectrum is not idle, a next LBT may be prepared to be performed on the unlicensed spectrum according to the configuration of LBT (for example, the next LBT is performed with how much time elapsed after performing one LBT). For the result for performing the next LBT on the unlicensed spectrum, it may be performed according to operations S2 and S3 of the embodiment shown in FIG. 1.

According to the embodiment of the disclosure, when the terminal needs to send the scheduling request through the unlicensed spectrum, unlike the related art where a timer is started after a scheduling request is triggered, the embodiment further determines whether the unlicensed spectrum is idle after the scheduling request is triggered, and the timer is started when the unlicensed spectrum is idle and the scheduling request is sent on the unlicensed spectrum. Accordingly, it may be ensured that the terminal starts up the timer only after sending the scheduling request, thereby preventing occurrence of a case: the timer is started when the terminal triggers a scheduling request but has not sent the scheduling request, which is caused by the unlicensed spectrum not being idle, such that the terminal cannot send the scheduling request before the timer times out, thereby ensuring that the terminal may promptly send the scheduling request.

Figure 2:
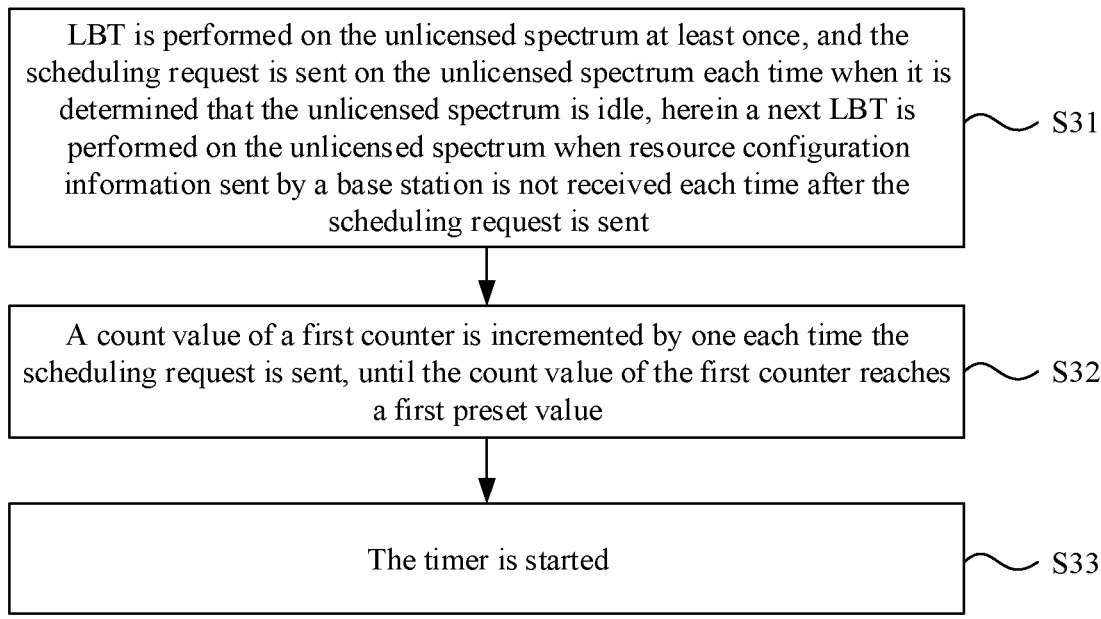
FIG. 2 is a schematic flowchart showing sending of a scheduling request on an unlicensed spectrum and starting a timer according to an embodiment of the disclosure.

FIG. 2 is a schematic flowchart showing sending of a scheduling request on an unlicensed spectrum and starting a timer according to an embodiment of the disclosure. As shown in FIG. 2, based on the embodiment shown in FIG. 1, the sending the scheduling request on the unlicensed spectrum and starting the timer includes the following operations.

In operation S31, LBT is performed on the unlicensed spectrum at least once, and the scheduling request is sent on the unlicensed spectrum each time when it is determined that the unlicensed spectrum is idle, herein a next LBT is performed on the unlicensed spectrum when resource configuration information sent by a base station is not received each time after the scheduling request is sent.

In operation S32, a count value of a first counter is incremented by one each time the scheduling request is sent, until the count value of the first counter reaches a first preset value.

In operation S33, the timer is started.

Because the unlicensed spectrum is different from the licensed spectrum, in addition to the terminal using the unlicensed spectrum, other devices than the terminal may also use the unlicensed spectrum, thus a case where the content sent by other devices using the unlicensed spectrum may collide with the content sent by the terminal using the unlicensed spectrum, is inevitable. In this case, the scheduling request sent by the terminal to the base station may collide with the content sent by other devices using the unlicensed spectrum, so that the base station may not receive the scheduling request, or may not decode the scheduling request smoothly even if it is received.

In order to avoid the problem caused by the above cases, according to the embodiments of the disclosure, LBT may be performed on the unlicensed spectrum at least once, and the scheduling request is sent on the unlicensed spectrum each time when it is determined that the unlicensed spectrum is idle, so that the scheduling request is sent to the base station many times, herein the count value of the first counter is incremented by one each time the scheduling request is sent, until the count value of the first counter reaches the first preset value, and the timer is started. Accordingly, it may be ensured that before the timer times out, the terminal may send the scheduling request to the base station many times without receiving the resource configuration information sent by the base station, so as to improve the probability of the base station receiving the scheduling request and successfully decoding the scheduling request, thereby ensuring that the resource configuration information sent by the base station is received as much as possible, and achieving the purpose of sending the scheduling request.

In an embodiment, the first preset value is pre-stored by the terminal or determined according to signaling sent by the base station.

In an embodiment, the first preset value may be pre-stored by the terminal, for example, may be pre-entered by a user of the terminal and stored by the terminal, or may be pre-determined and stored by the terminal according to a communication protocol with the base station.

In an embodiment, the first preset value may be determined according to signaling sent by the base station, for example, the base station may indicate the first preset value to the terminal by sending Radio Resource Control (RRC) signaling to the terminal.

Figure 3:
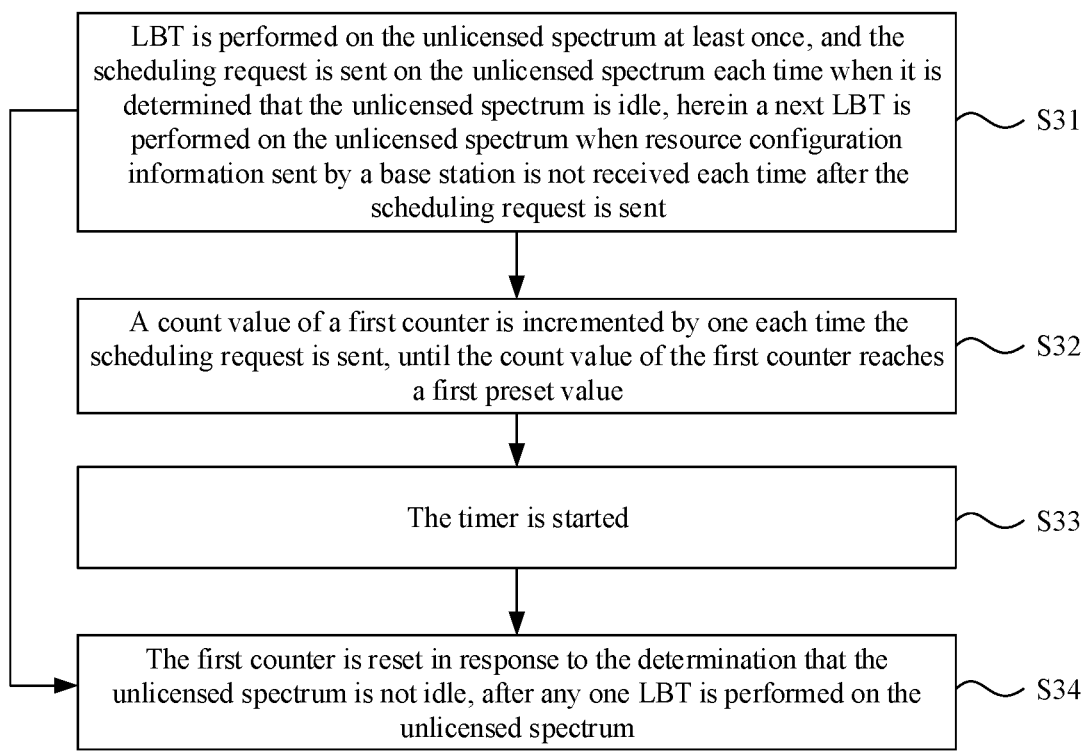
FIG. 3 is a schematic flowchart showing another sending of a scheduling request on an unlicensed spectrum and starting a timer according to an embodiment of the disclosure.

FIG. 3 is a schematic flowchart showing another sending of a scheduling request on an unlicensed spectrum and starting a timer according to an embodiment of the disclosure. As shown in FIG. 3, based on the embodiment shown in FIG. 2, the sending the scheduling request on the unlicensed spectrum and starting the timer further includes the following operations.

In operation S34, the first counter is reset in response to the determination that the unlicensed spectrum is not idle, after any one LBT is performed on the unlicensed spectrum.

During performing LBT on the unlicensed spectrum each time, a case where the unlicensed spectrum is not idle may occur, the terminal may wait until the next LBT is performed and it is determined that the unlicensed spectrum is idle, then may continue to send the scheduling request on the unlicensed spectrum. In this case, the operation of sending the scheduling request by the terminal may be interrupted for a relatively long time. This may result in that during the base station receiving the scheduling requests sent by the terminal many times, some adjacent scheduling requests may be received at a relatively long interval. For decoding the scheduling request, the base station may need to decode based on multiple scheduling requests continuously received in a short time. However, the above case may cause the base station to generate a relatively large interval among the received multiple scheduling requests. Therefore, the base station may not determine that multiple scheduling requests are continuously received in a short time, thereby causing the failure of base station to decode the scheduling request.

In addition, the unlicensed spectrum may be poor in stability with respect to the licensed spectrum, for example, there may be a stage in which communication quality is good within a time length, and there may also be a stage in which communication quality is poor. When there is a time interval between multiple scheduling requests sent by the terminal to the base station due to failure of LBT, the opportunity of sending the scheduling request by the terminal before and after the interval may occur with a relatively high probability, which exactly coincides with two stages in which communication quality is poor in the unlicensed spectrum respectively, so that the base station cannot receive the scheduling request. However, When there is no time interval between multiple scheduling requests sent by the terminal to the base station due to failure of LBT, since the unlicensed spectrum has a low probability to be continuously in a stage with poor communication quality within a time length, the opportunity of the scheduling request sent by the terminal at least once has a large probability to coincide with the stage with good communication quality in the unlicensed spectrum, thereby facilitating the base station to receive the scheduling request.

According to the embodiment of the disclosure, it may be determined that the first counter is reset when the unlicensed spectrum is not idle, so that an operation of sending the scheduling request by the terminal is counted again. However, the first counter triggers the timer to start only when it is continuously determined that the unlicensed spectrum is idle and the number of sending the scheduling request reaches the first preset value. Therefore, there is not any longer time interval in the time when the base station may continuously receive the scheduling request, thereby facilitating the base station to successfully receive the scheduling request and decode the scheduling request, and further send the resource configuration information to the terminal according to the scheduling request obtained by the decoding.

Figure 4:
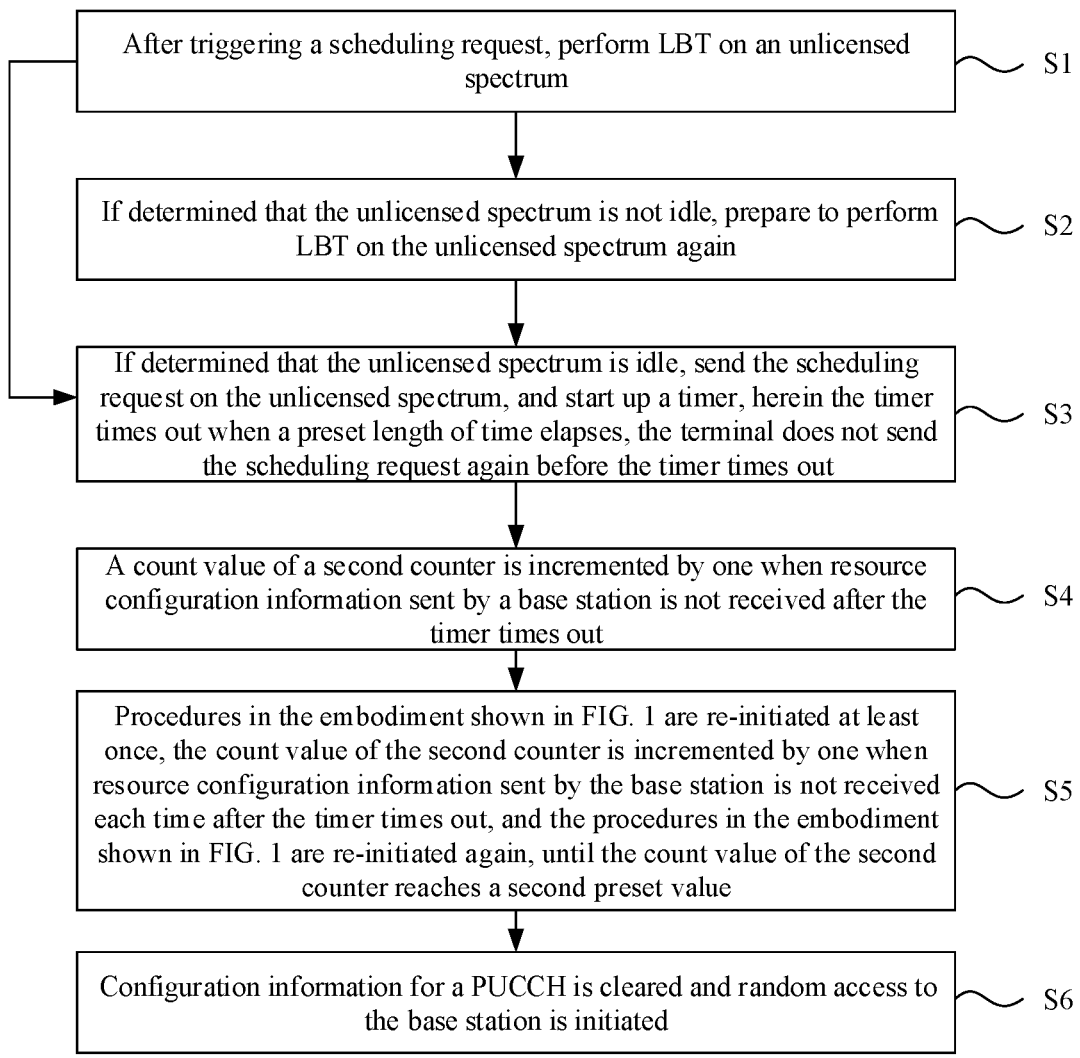
FIG. 4 is a schematic flowchart showing another method for sending a scheduling request according to an embodiment of the disclosure.

FIG. 4 is a schematic flowchart showing another method for sending a scheduling request according to an embodiment of the disclosure. As shown in FIG. 4, based on the embodiment shown in FIG. 1, the method further includes the following operations.

In operation S4, a count value of a second counter is incremented by one when resource configuration information sent by a base station is not received after the timer times out.

In operation S5, the procedures in the embodiment shown in FIG. 1 are re-initiated at least once, that is, operation S1 is performed to perform LBT on the unlicensed spectrum, operation S2 is performed to prepare to perform LBT on the unlicensed spectrum again in response to the determination that the unlicensed spectrum is not idle, and operation S3 is performed to send the scheduling request on the unlicensed spectrum and start a timer in response to the determination that the unlicensed spectrum is idle.

Herein, the count value of the second counter is incremented by one when resource configuration information sent by the base station is not received each time after the timer times out, and the procedures in the embodiment shown in FIG. 1 are re-initiated again, until the count value of the second counter reaches a second preset value.

In operation S6, configuration information for a PUCCH is cleared and random access to the base station is initiated.

In an embodiment, after the timer times out, the count value of the second counter may be incremented by one, and the procedures in the embodiment shown in FIG. 1 may be re-initiated at least once, that is, the scheduling request is sent again according to the embodiment shown in FIG. 1 and the timer is started.

When the count value of the second counter reaches the second preset value, it indicates that the number of the timer timing out reaches the second preset value. In this case, it may be determined that the terminal has sent a sufficient number of scheduling requests, but has not received the resource configuration information sent by the base station. In order to avoid wasting resources due to sending the scheduling request by the terminal for too many times, the configuration information for the PUCCH may be cleared, and random access to the base station is initiated, so that the communication connection with the base station is re-established, and communication is performed according to the resource newly configured by the base station.

In an embodiment, the second preset value is pre-stored by the terminal or determined according to signaling sent by the base station.

In an embodiment, the second preset value may be pre-stored by the terminal, for example, may be pre-entered by a user of the terminal and stored by the terminal, or may be pre-determined and stored by the terminal according to a communication protocol with the base station.

In an embodiment, the second preset value may be determined according to signaling sent by the base station, for example, the base station may indicate the second preset value to the terminal by sending RRC signaling to the terminal.

In an embodiment, the preset length of time is pre-stored by the terminal or determined according to signaling sent by a base station.

In an embodiment, the preset length of time may be pre-stored by the terminal, for example, may be pre-entered by a user of the terminal and stored by the terminal, or may be pre-determined and stored by the terminal according to a communication protocol with the base station.

In an embodiment, the preset length of time may be determined according to signaling sent by the base station, for example, the base station may indicate the preset length of time to the terminal by sending RRC signaling to the terminal.

Corresponding to the foregoing embodiment of the method for sending a scheduling request, the disclosure further provides an embodiment of an apparatus for sending a scheduling request.

Figure 5:
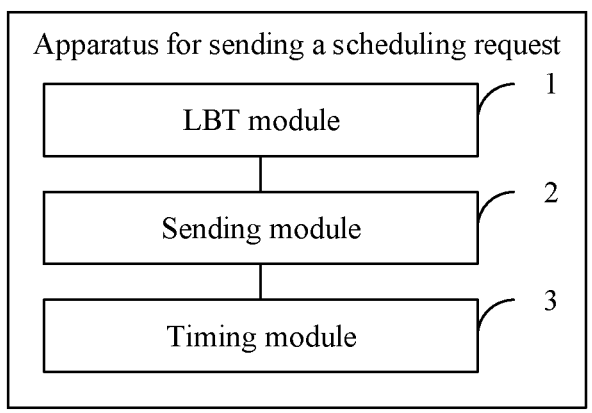
FIG. 5 is a schematic block diagram showing an apparatus for sending a scheduling request according to an embodiment of the disclosure.

FIG. 5 is a schematic block diagram showing an apparatus for sending a scheduling request according to an embodiment of the disclosure. The apparatus shown in the embodiment may be applied to a terminal, herein the terminal may be an electronic device such as a mobile phone, a tablet computer, a wearable device etc., and the terminal may be used as a UE to communicate with a base station, for example, may communicate with the base station based on the 5G NR technology.

As shown in FIG. 5, the apparatus includes an LBT module 1, a second module 2 and a timing module 3, when the terminal needs to send the scheduling request through an unlicensed spectrum.

The LBT module 1 is configured to perform LBT on the unlicensed spectrum after the scheduling request is triggered; herein LBT is prepared to be performed on the unlicensed spectrum again in response to a determination that the unlicensed spectrum is not idle.

The sending module 2 is configured to send the scheduling request on the unlicensed spectrum in response to a determination that the unlicensed spectrum is idle.

The timing module 3 is configured to start a timer, and make the scheduling request not sent by the terminal again before the timer times out, herein the timer times out when a preset length of time elapses.

Figure 6:
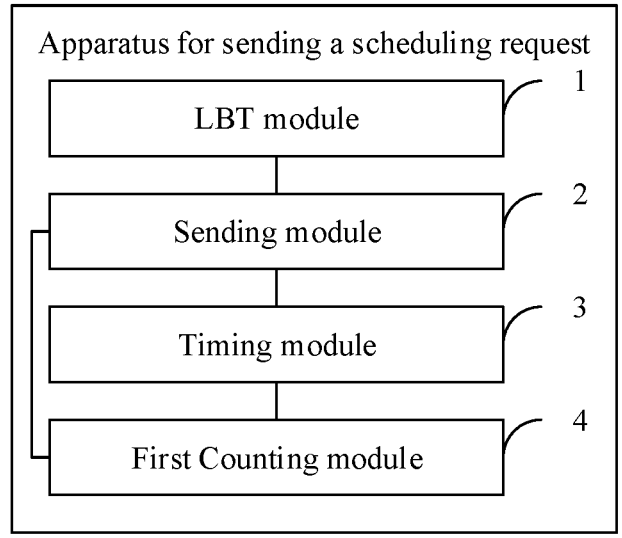
FIG. 6 is a schematic block diagram showing another apparatus for sending a scheduling request according to an embodiment of the disclosure.

FIG. 6 is a schematic block diagram showing another apparatus for sending a scheduling request according to an embodiment of the disclosure. As shown in FIG. 6, based on the embodiment shown in FIG. 5, the LBT module 1 is configured to perform LBT on the unlicensed spectrum at least once.

The sending module 2 is configured to send the scheduling request on the unlicensed spectrum each time when it is determined that the unlicensed spectrum is idle, herein the LBT module is configured to perform a next LBT on the unlicensed spectrum when resource configuration information sent by a base station is not received each time after the scheduling request is sent.

The apparatus further includes a first counting module 4.

The first counting module 4 is configured to increment a count value of a first counter by one each time the scheduling request is sent by the sending module, until the count value of the first counter reaches a first preset value.

Herein the timing module 3 is configured to start the timer responsive to the count value of the first counter reaching the first preset value.

In an embodiment, the first preset value is pre-stored by the terminal or determined according to signaling sent by a base station.

Figure 7:
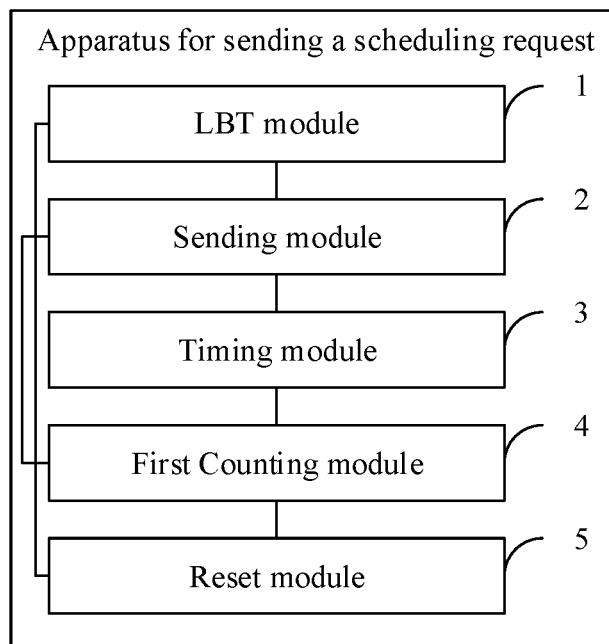
FIG. 7 is a schematic block diagram showing yet another apparatus for sending a scheduling request according to an embodiment of the disclosure.

FIG. 7 is a schematic block diagram showing yet another apparatus for sending a scheduling request according to an embodiment of the disclosure. As shown in FIG. 7, based on the embodiment shown in FIG. 6, the apparatus further includes a reset module 5.

The reset module 5 is configured to reset the first counter in response to the determination that the unlicensed spectrum is not idle, after any one LBT is performed by the LBT module on the unlicensed spectrum.

Figure 8:
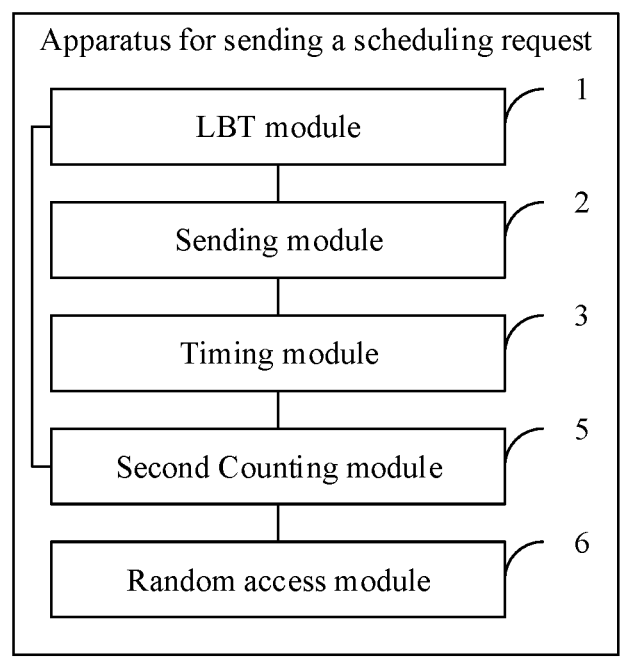
FIG. 8 is a schematic block diagram showing yet another apparatus for sending a scheduling request according to an embodiment of the disclosure.

FIG. 8 is a schematic block diagram showing yet another apparatus for sending a scheduling request according to an embodiment of the disclosure. As shown in FIG. 8, based on the embodiment shown in FIG. 5, the apparatus further includes a second counting module 5.

The second counting module 5 is configured to increment a count value of a second counter by one when resource configuration information sent by a base station is not received after the timer times out.

Herein the LBT module 1 is configured to perform LBT on the unlicensed spectrum at least once after the scheduling request is triggered; herein LBT is prepared to be performed on the unlicensed spectrum again in response to the determination that the unlicensed spectrum is not idle.

The sending module 2 is configured to send the scheduling request on the unlicensed spectrum at least once in response to a determination that the unlicensed spectrum is idle.

The timing module 3 is configured to start the timer at least once, and make the scheduling request not sent by the terminal again before the timer times out, herein the timer times out when a preset length of time elapses.

Herein the count value of the second counter is incremented by one when resource configuration information sent by the base station is not received each time after the timer times out, until the count value of the second counter reaches a second preset value.

A random-access module 6 is configured to clear configuration information for a PUCCH and initiate random access to the base station.

In an embodiment, the second preset value is pre-stored by the terminal or determined according to signaling sent by the base station.

In an embodiment, the preset length of time is pre-stored by the terminal or determined according to signaling sent by a base station.

With respect to the apparatus in the above embodiment, the specific manner in which the respective modules perform operations has been described in detail in the related method embodiment, and will not be described in detail herein.

With respect to the apparatus embodiment, since it substantially corresponds to the method embodiment, the relevant part may be made reference to the partial description of the method embodiment. The apparatus embodiment as described above is merely illustrative, herein the units illustrated as separate elements may be or may not be physically separate, and the components shown as units may be or may not be physical units, i.e., may be located at one position, or may be distributed on multiple network units. Part or all of the modules may be selected according to actual needs to achieve the objectives of the solution of the embodiment. Those of ordinary skill in the art may understand and practice them without paying any creative work.

An embodiment of the disclosure further provides an electronic device including:

a processor; and a memory configured to store instructions executable by the processor.

Herein the processor is configured to implement steps in the method of any one of the above embodiments.

An embodiment of the disclosure further provides a computer-readable storage medium having stored thereon a computer program that, when executed by a processor, implements steps in the method of any one of the above embodiments.

Figure 9:
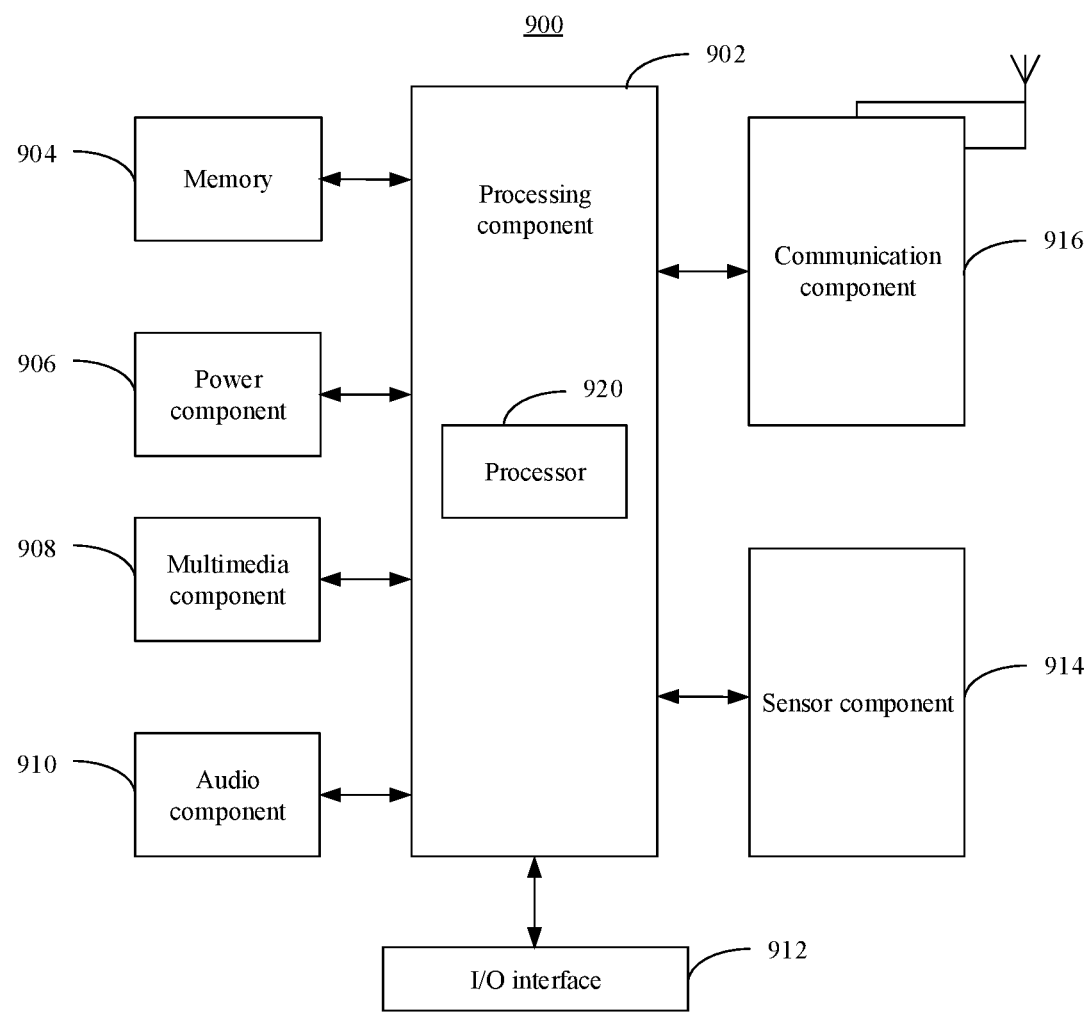
FIG. 9 is a schematic block diagram showing an apparatus for sending a scheduling request according to an embodiment of the disclosure.

FIG. 9 is a schematic block diagram showing an apparatus 900 for sending a scheduling request according to an embodiment of the disclosure. For example, the apparatus 900 may be a mobile phone, a computer, a digital broadcast terminal, a messaging device, a game console, a tablet device, a medical device, an exercise device, a personal digital assistant, etc.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the apparatus 900, such as the operations associated with display, telephone calls, data communications, camera operations and recording operations. The processing component 902 may include one or more processors 920 to execute instructions to perform all or part of the steps in the above methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, video, etc. The memory 904 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). When the screen includes the TP, the screen may be implemented as a touch screen to receive input signals from the user. The TP includes one or more touch sensors to sense touches, swipes, and gestures on the TP. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules which may be a keyboard, a click wheel, buttons, etc. The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components, e.g., the display and the keypad of the apparatus 900, a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor or a temperature sensor.

The communication component 916 is configured to facilitate communication, wired or wirelessly, between the apparatus 900 and other devices. The apparatus 900 can access a wireless network based on a communication standard, such as WiFi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method of any one of the above embodiments.

In exemplary embodiments, there is also provided a non-transitory computer-readable storage medium including instructions, such as the memory 904 including instructions, the instructions may be executable by the processor 920 in the apparatus 900, for performing the above methods. For example, the non-transitory computer-readable storage medium may be a ROM, a RAM, a CD-ROM, a magnetic tape, a floppy disc, an optical data storage device, etc.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and embodiments may be considered as exemplary only, with a true scope and spirit of the disclosure being indicated by the following claims.

It will be appreciated that the disclosure is not limited to the exact construction that has been described above and illustrated in the drawings, and that various modifications and changes may be made without departing from the scope thereof. It is intended that the scope of the disclosure may be limited only by the appended claims.

It should be noted that in this context, relational terms such as first and second etc. are only used to distinguish one entity or operation from another entity or operation, without necessarily requiring or implying any of such actual relationships or orders between such entities or operations. The terms "includes," "including," or any other variation thereof, are intended to cover a non-exclusive inclusion, such that a process, method, article or device including a list of elements includes not only those elements but also other elements which are not listed clearly, or also includes elements inherent to such process, method, article or device. Without more limitations, an element defined by the statement "include a . . . " does not exclude additional identical elements existing in the process, method, article or device including said element.

The above has described in detail the method and apparatus provided by the embodiments of the disclosure, and specific examples have been used herein to set forth the principles and embodiments of the disclosure. The above descriptions of the embodiments are merely intended to assist in understanding the method of the disclosure and the core concepts thereof. At the same time, variations in the detailed description and scope of application will occur to those of ordinary skill in the art based on the idea of the disclosure, and in conclusion, the contents of the specification are not construed as limitation of the disclosure.

What is claimed is:

1. A method for sending a scheduling request, performed by a terminal, the method comprising: when the terminal needs to send the scheduling request through an unlicensed spectrum,
   performing listen before talk (LBT) on the unlicensed spectrum after the scheduling request is triggered;
   in response to a determination that the unlicensed spectrum is not idle, preparing to perform LBT on the unlicensed spectrum again; and
   in response to a determination that the unlicensed spectrum is idle, sending the scheduling request on the unlicensed spectrum and starting a timer, and not sending, by the terminal, the scheduling request again before the timer times out, wherein the timer times out when a preset length of time elapses;
   wherein said sending the scheduling request on the unlicensed spectrum and starting the timer comprises:
   performing LBT on the unlicensed spectrum at least once, and sending the scheduling request on the unlicensed spectrum each time when it is determined that the unlicensed spectrum is idle, wherein a next LBT is performed on the unlicensed spectrum when resource configuration information sent by a base station is not received each time after the scheduling request is sent;
   incrementing a count value of a first counter by one each time the scheduling request is sent, until the count value of the first counter reaches a first preset value; and
   starting the timer responsive to the count value of the first counter reaching the first preset value.

2. The method of claim 1, wherein the first preset value is pre-stored by the terminal or determined according to signaling sent by the base station.

3. The method of claim 1, wherein said sending the scheduling request on the unlicensed spectrum and starting the timer further comprises:
   resetting the first counter in response to the determination that the unlicensed spectrum is not idle, after any one LBT is performed on the unlicensed spectrum.

4. The method of claim 1, further comprising:
   incrementing a count value of a second counter by one when resource configuration information sent by a base station is not received after the timer times out;
   re-initiating said performing, said preparing, and said sending at least once, wherein the count value of the second counter is incremented by one when resource configuration information sent by the base station is not received each time after the timer times out, and said performing, said preparing, and said sending are re-initiated again until the count value of the second counter reaches a second preset value; and
   clearing configuration information for a physical uplink control channel (PUCCH) and initiating random access to the base station.

5. The method of claim 4, wherein the second preset value is pre-stored by the terminal or determined according to signaling sent by the base station.

6. The method of claim 1, wherein the preset length of time is pre-stored by the terminal or determined according to signaling sent by a base station.

7. An apparatus for sending a scheduling request in a terminal, comprising:
   a processor; and
   a memory for storing processor-executable instructions,
   wherein the processor is configured to, when the terminal needs to send the scheduling request through an unlicensed spectrum:
   perform LBT on the unlicensed spectrum after the scheduling request is triggered;
   in response to a determination that the unlicensed spectrum is not idle, prepare to perform LBT on the unlicensed spectrum again; and
   in response to a determination that the unlicensed spectrum is idle, send the scheduling request on the unlicensed spectrum and start a timer, and not send the scheduling request again before the timer times out, wherein the timer times out when a preset length of time elapse;
   wherein to send the scheduling request on the unlicensed spectrum and start the timer, the processor is configured to:
   perform LBT on the unlicensed spectrum at least once;
   send the scheduling request on the unlicensed spectrum each time when it is determined that the unlicensed spectrum is idle, wherein a next LBT is performed on the unlicensed spectrum when resource configuration information sent by a base station is not received each time after the scheduling request is sent;

increment a count value of a first counter by one each time the scheduling request is sent, until the count value of the first counter reaches a first preset value; and start the timer responsive to the count value of the first counter reaching the first preset value.

8. The apparatus of claim 7, wherein the first preset value is pre-stored by the terminal or determined according to signaling sent by a base station.

9. The apparatus of claim 7, wherein to send the scheduling request on the unlicensed spectrum and start the timer, the processor is further configured to:

reset the first counter in response to the determination that the unlicensed spectrum is not idle, after any one LBT is performed by the LBT module on the unlicensed spectrum.

10. The apparatus of claim 7, wherein the processor is further configured to:

increment a count value of a second counter by one when resource configuration information sent by a base station is not received after the timer times out;

re-initiate said performing, said preparing, and said sending at least once, wherein the count value of the second counter is incremented by one when resource configuration sent by the base station is not received each time after the timer times out, and said performing, said preparing, and said sending are re-initiated again until the count value of the second counter reaches a second preset value; and clear configuration information for a physical uplink control channel (PUCCH) and initiating random access to the base station.

11. The apparatus of claim 10, wherein the second preset value is pre-stored by the terminal or determined according to signaling sent by the base station.

12. The apparatus of claim 7, wherein the preset length of time is pre-stored by the terminal or determined according to signaling sent by a base station.

13. A non-transitory computer-readable storage medium having stored thereon computer-executable instructions that, when executed by a processor, cause the processor to perform operations of: when a terminal including the processor needs to send the scheduling request through an unlicensed spectrum, performing listen before talk (LBT) on the unlicensed spectrum after the scheduling request is triggered;

in response to a determination that the unlicensed spectrum is not idle, preparing to perform LBT on the unlicensed spectrum again; and in response to a determination that the unlicensed spectrum is idle, sending the scheduling request on the unlicensed spectrum and starting a timer, and not sending, by the terminal, the scheduling request again before the timer times out, wherein the timer times out when a preset length of time elapses;

wherein sending the scheduling request on the unlicensed spectrum and starting the timer comprises:

performing LBT on the unlicensed spectrum at least once, and sending the scheduling request on the unlicensed spectrum each time when it is determined that the unlicensed spectrum is idle, wherein a next LBT is performed on the unlicensed spectrum when resource configuration information sent by a base station is not received each time after the scheduling request is sent;

incrementing a count value of a first counter by one each time the scheduling request is sent, until the count value of the first counter reaches a first preset value; and starting the timer responsive to the count value of the first counter reaching the first preset value.

14. The non-transitory computer-readable storage medium of claim 13, wherein the first preset value is pre-stored by the terminal or determined according to signaling sent by the base station.

15. The non-transitory computer-readable storage medium of claim 13, wherein sending the scheduling request on the unlicensed spectrum and starting the timer further comprises:

resetting the first counter in response to the determination that the unlicensed spectrum is not idle, after any one LBT is performed on the unlicensed spectrum.

16. The non-transitory computer-readable storage medium of claim 13, wherein when the computer-executable instructions are executed by the processor, the processor is caused to perform further operations of:

incrementing a count value of a second counter by one when resource configuration information sent by a base station is not received after the timer times out;

re-initiating said performing, said preparing, and said sending at least once, wherein the count value of the second counter is incremented by one when resource configuration information sent by the base station is not received each time after the timer times out, and said performing, said preparing, and said sending are re-initiated again until the count value of the second counter reaches a second preset value; and clearing configuration information for a physical uplink control channel (PUCCH) and initiating random access to the base station.

17. The method of claim 16, wherein the second preset value is pre-stored by the terminal or determined according to signaling sent by the base station.

* * * * *